Figure 1:
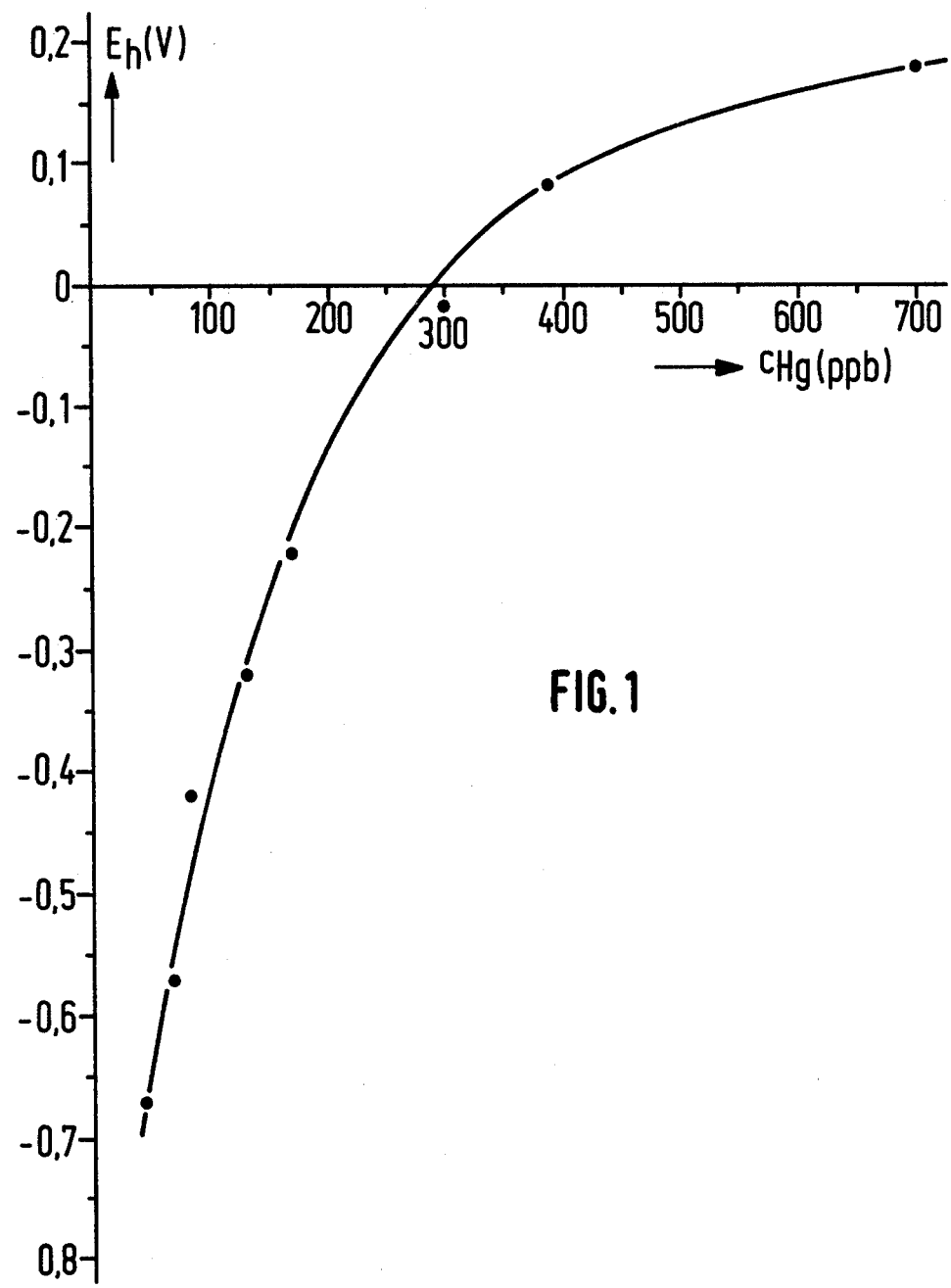

United States Patent [19]

Krieg et al.

[11] 4,108,769

[45] Aug. 22, 1978

[54] PROCESS FOR REDUCING THE MERCURY CONTENT OF INDUSTRIAL WASTE WATERS

[75] Inventors: Martin Krieg, Gablingen; Theo Olffers, Gersthofen, both of Fed. Rep. of Germany

[73] Assignee: Hoechst Aktiengesellschaft, Frankfurt am Main, Fed. Rep. of Germany

[21] Appl. No.: 780,126

[22] Filed: Mar. 22, 1977

[30] Foreign Application Priority Data

Mar. 27, 1976 [DE] Fed. Rep. of Germany ....... 2613128

[51] Int. Cl.$^2$ .............................................. C02C 5/04
[52] U.S. Cl. .................................................... 210/50
[58] Field of Search .......................... 210/50, 59, 63 R

[56] References Cited

U.S. PATENT DOCUMENTS

| | | |
|---|---|---|
| 3,764,528 | 10/1973 | Cadmus .................................. 210/50 |
| 3,847,598 | 11/1974 | Coulter et al. .......................... 210/50 |
| 3,857,704 | 12/1974 | Coulter .................................. 210/50 |

*Primary Examiner*—Thomas G. Wyse
*Attorney, Agent, or Firm*—Connolly and Hutz

[57] ABSTRACT

The invention deals with the reduction of the mercury content of industrial waste waters, especially those from a chlorine-alkali electrolysis using the amalgam process.

According to the invention all mercury present in the waste water is converted to the form of $Hg^{++}$ ions by adding chlorine. Subsequently $Fe^{++}$ ions are added. The pH of the solution is raised until a redox potential of from $-0.1$ to $-0.8$ volts, relative to the normal hydrogen electrode, is obtained. The mercury precipitated and the iron oxide hydrate formed may be filtered from the waste water. Residual mercury contents in the filtrate of about 50 mg/m$^3$ may be obtained.

3 Claims, 2 Drawing Figures

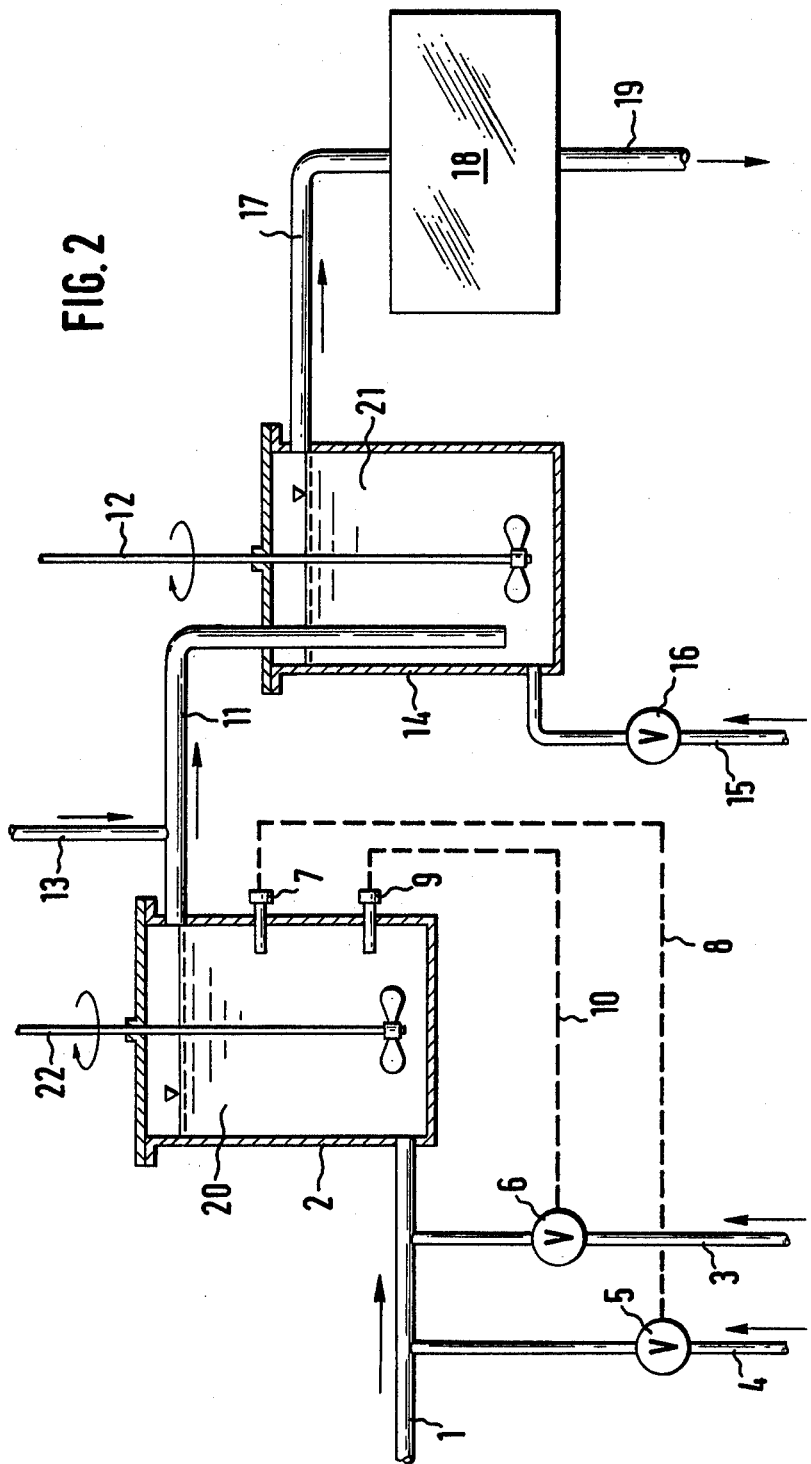

PROCESS FOR REDUCING THE MERCURY CONTENT OF INDUSTRIAL WASTE WATERS

Industrial waste waters often contain mercury in metallic and/or ionic form which, because of its toxicity, is very dangerous for rivers, creeks, lakes etc., because it may be introduced into the human body via fish and other organisms serving as food for man. Therefore, the mercury emission of industrial plants must be kept as low as possible. Among the plants emitting mercury along with their waste waters are chlorine-alkali electrolyses operating according to the amalgam process.

Numerous processes for reducing the mercury content of industrial waste waters are described in the literature. There is for example a process according to which mercury ions are reduced to metallic mercury by means of sodium-boron hydride (U.S. Pat. No. 3,764,528). However, this process is not easy to operate, because the reducing agent decomposes at a pH below 9.5 with development of hydrogen, and the mercury metal which forms in the reaction precipitates in a very finely distributed form and coagulates with difficulty only. A further serious disadvantage resides in the fact that hydrogen is liberated which carries mercury vapors to an extent corresponding to the vapor pressure of mercury at the temperature of the process and thus causes secondary pollution of the air, unless it is liberated from these vapors by a treatment with dilute nitric acid. This posterior removal of mercury from the waste gases is an additional, inconvenient process step which, due to the cost of the reducing agent, further diminishes the profitability of the process.

Another process uses sodium sulfide as precipitating agent (Japanese Pat. No. 66 7012). The disadvantage of this process resides in the fact that the mercury sulfide is formed very slowly and that this formation depends on the pH. Furthermore, formation of a soluble complex anion of $[HgS_2]^{2-}$ composition may occur in the presence of an excess of precipitating agent, thus adversely affecting the efficiency of the process. Moreover, soluble chlorides which are always present in the waste waters of a chlorine-alkali electrolysis have a negative effect on the precipitation of mercury sulfide, and the precipitated mercury sulfide is dispersed in the water to be purified in such a finely distributed form that its elimination requires an additional flocculant. And finally, excess flocculant has to be carefully removed from the water in order to prevent secondary pollution.

Alternatively, thio-urea and salt of hydroxylamine have been proposed for precipitating mercury and/or mercury salts from waste waters (German Offenlegungsschrift No. 2,437,779). Besides relatively long reaction times, flocculants are required also in this case, and the residual mercury content of the treated waste water is generallly not below 100 ppb.

Another process is known according to which mercury salts contained in waste waters are reduced by means of hydrazine (German Offenlegungsschrift No. 1,958,169). Starting from pure $HgCl_2$ solutions, residual mercury contents of less than 100 ppb may be attained in some cases, but only with the addition of flocculants (for example $CaCl_2$), or of special active charcoal as additional adsorbent. When this process is applied in the industrial practice, for example for the work-up of waste waters from a chlorine-alkali electrolysis operating according to the amalgam process, filter combinations with sand and active charcoal packings consisting partially of expensive, specially treated coal are required besides the sedimentation tubes in order to attain acceptable results of residual mercury (less than 100 ppb).

Similar processes using tin(II) ions, hypophosphorous acid, formaldehyde, metallic iron, zinc, sodium, tin, copper etc. as reducing agent are mentioned in the literature as well. However, there are drawbacks such as long reaction times, incomplete reaction, heating required, inactivation of the metal surfaces by amalgam formation, secondary pollution of the treated waste waters by residues of agents etc.

Recently, the technology of mercury removal from waste waters has switched over to a large extent to processes using ion exchangers (for example Swedish Pat. No. 330,863). In general, it can be stated that this method is difficult and expensive, because the exchanger compositions are destroyed in most cases by strong oxidants such as chlorine or hypochlorite ions, and furthermore because the problem of exchanger regeneration has not been solved as yet in a satisfactory manner, so that the resins have to be discarded after several runs already. Moreover, some exchanger compositions lose their activity very rapidly when the sodium chloride content of the water to be purified exceeds about 10 g/liter, which is often the case in waste waters of chlorine-alkali electrolyses. Furthermore, only special types of exchangers are appropriate, because in a sodium chloride containing solution the mercury is partially present as $[HgCl_4]^{2-}$ anion and the active groups of the exchangers are often blocked by foreign ions, for example $SO_3^{2-}$ or $SO_4^{2-}$. The residual mercury content obtainable in these processes is often from 0.1 to 0.2 ppm still (starting values from 1 to 5 ppm only) despite series-connection of two exchanger columns, unless the waste water is after-treated in subsequent absorption towers charged with special active charcoal which cannot be regenerated.

It was therefore an object of the present invention to provide a process for reducing the mercury content of industrial waste waters, especially those from chlorine-alkali electrolyses operating according to the amalgam process, which can be carried out in a simple manner, which is economically interesting and satisfactory in its result. A further object was to see to it that the process is of technological robustness and adapted to the use of those chemical agents which are generally present already in chlorine-alkali electrolyses, that is, sodium chloride and sodium hydroxide, which are contained in such waste waters besides traces of mercury.

In accordance with this invention, there is provided a process for reducing the mercury content of industrial waste waters, especially those from chlorine-alkali electrolyses operating according to the amalgam process, which comprises converting the total amount of mercury contained in such waters to the ionic, bivalent oxidation state by adjusting a content of from 2 to 50 mg of active chlorine per liter of waste water in a mineral acid medium by addition of chlorine, chlorinated water or sodium hypochlorite, subsequently adding iron(II) ions until a content of from 0.1 to 1.5 g of such ions per liter of waste water is attained, and then adjusting a redox potential of from $-0.1$ to $-0.8$ volt, relative to the normal hydrogen electrode, by addition of chemical agents increasing the pH, thus reducing the mercury and precipitating it together with the iron oxide hydrates formed, and finally eliminating the precipitated products.

The process of the invention surprisingly allows the obtention of a satisfactory residual mercury content, even at a more than 14,000-fold excess of sodium chloride (relative to the weight of mercury contained in a m³ of waste water), that is, under extremely unfavorable conditions. This was not to be expected because the mercury ion, under the conditions as described, is bound in complex form as stable tetrachloromercurate(II) anion. Furthermore, it was not to be expected that, for the obtention of a satisfactory residual mercury content within the scope of this invention, it is nearly unimportant how much mercury is contained in the waste water to be treated. Thus, it has been observed that even the waste water of a chlorine-alkali electrolysis which contained 162 g of mercury per m³ (adjusted by addition of $HgCl_2$ solution to this waste water), could be purified to a residual mercury content of only 0.05 g/m³, which corresponds to a demercuration degree of 99.97%. The efficiency of the process of the invention is therefore ensured also in cases where the waste water to be treated contains an extremely large amount of mercury or sodium chloride.

Further advantages of the operation mode of the invention are the following: first, except a superficial clarification of the waste waters, no preliminary or intermediate purification steps are required; second, and this is especially important, the oxidant to be used in excess in the first process step has not to be removed before the reduction of the mercury, but is inactivated only with the use of a small excess amount of cheap reducing agent or alkali lye which latter one is anyhow at disposal in chlorine-alkali electrolyses.

The use of iron(II) salts as reducing agents has the advantage that the almost insoluble mercury (I) salt formed is precipitated in a practically quantitative manner simultaneously with the mixture of iron(II) and iron(III) oxide hydrates precipitating from the solution, so that an additional flocculant is generally no longer required.

The demercuration according to this invention of waste waters stemming for example from a chlorine-alkali electrolysis using a streaming mercury cathode and containing mercury in metallic as well as ionic form (the amount of metal being generally from 30 to 80% of the total mercury content) is carried out in detail as follows: first, all mercury is converted to the ionic form, that is, the bivalent oxidation state. This is carried out by acidifying the water flowing into the apparatus by means of hydrochloric or sulfuric acid which are generally at disposal to obtain a pH of 4.5 or less, and by adding chlorine in gaseous form, chlorinated water or sodium hypochlorite to this acidified solution until a content of active chlorine of about 2 to 50, preferably 5 to 30 mg/l is attained. The pH is not critical; a pH of from 1 to 3 being however preferred, since higher values require the addition of larger chlorine amounts, and lower values necessitate a relatively large amount of acid. Because most of the waste waters of chlorine-alkali electrolyses contain also hypochlorite ions which, on acidification, form chlorine or hypochlorous acid, the redox potential necessary for the oxidation of the metallic mercury is sometimes established in the water to be demercurated by the acidification already, so that in these cases the addition of an oxidant may be omitted.

The genuine demercuration is carried out by adding an excess of bivalent iron ions to the mercury ions now being present in bivalent form, and by subsequently establishing the low redox potential in the solution required for the reduction of mercury ions even in small amounts by addition of agents increasing the pH, for example sodium hydroxide of calcium hydroxide, preferably alkali lyes. The anion of the Fe(II) salt is not critical. An amount of iron(II) salt solution, for example iron(II) sulfate solution or iron(II)chloride solution, is used which ensures a concentration of from 0.1 to 0.5, preferably 0.3 to 1.0 g of iron(II) ions per liter of waste water, and the redox potential in the solution containing the mercury and iron ions is adjusted to $-0.1$ to $-0.8$, preferably $-0.4$ to $-0.7$, and especially $-0.5$ to $-0.6$, volts, relative to the normal hydrogen electrode. Higher concentration of iron(II) ions may be used, but they do not bring about any further advantages. The $Fe^{++}$ content may be determined by titrimetric methods. In order to prevent undesirable increase of potential by atmospheric oxygen and possible reoxidation of the mercury, it may be advantageous to carry out the alkalization and the subsequent isolation of the precipitated products under an atmosphere of inert gas, for example nitrogen.

The precipitated mixture of scarcely soluble mercury(I) salt, iron(II) and iron(III) oxide hydrates is separated according to known methods, for example by filtration, optionally with the aid of usual flocculants remaining in the sludge, for example polyacrylamides, which are used in amounts of from 1 to 5 g/m³ of water.

Depending on the mercury content of the sludge which is determined by the specific conditions of the manufacturing plant emitting the waste waters, it may be economic to recover the mercury, for example by means of distillation processes or known dissolution processes using hypochlorite ion containing solutions. In the case where work-up is not profitable the sludge is forwarded to a safe dump.

In the filtrate there are only traces of mercury, and except the anions stemming from the iron(II) salt used and $OH^-$ ions or alkali ions, no foreign substances are introduced into the water treated, because the precipitation of iron in the pH range required for the process of the invention is nearly quantitative. The filtrate flowing off has an average iron content of 0.15 mg/l.

The quantitative relation between the redox potential $E_h$ (measured in volts) adjusted in the solution and the residual mercury content of the treated waste water $C_{Hg}$ (measured in ppb) is shown in the diagram of FIG. 1 of the accompanying drawings.

The following examples illustrate operation and effect of the process of the invention. All tests were carried out at normal temperature (about 20° C). For the analytical mercury examination, an atomic absorption spectrophotometer (Coleman MAS 50) was used, which had been specially designed for this purpose.

EXAMPLE 1

In a laboratory apparatus according to FIG. 2 of the accompanying drawings, a continuously flowing waste water current of 2.2 liters/h stemming from a chlorine-alkali electrolysis operating according to the amalgam process, the NaCl content of which current had been deliberately increased by addition of brine, was fed to the oxidation vessel 2 via the duct 1. The (total) mercury content of the solution fed in was 8.0 mg/liter, the NaCl content 118.0 g/liter and the pH 12.0. Via the duct 3, such an amount of 31% hydrochloric acid and via the duct 4, such an amount of chlorinated water containing about 1 g/liter of active chlorine were fed to the duct 1 that the pH of the solution 20 in the oxidation vessel 2 was maintained constant at 1.9, and the redox potential was a constant 1.25 volts, relative to the normal hydrogen electrode. The feed was automatic and controlled by the control valve 5 for the chlorinated water, and the control valve 6 for the hydrochloric acid. Control valve 5 was operated by the measuring device 7 for the redox potential via the pneumatic line 8; and control valve 6 by the measuring device 9 for the pH via the pneumatic line 10. Thus, a content of 5.4 mg/liter of active chlorine was adjusted. After a mean residence time of about 1 hour, the waste water 20 left the oxidation vessel 2 provided with an agitator 22 via the duct 11, to which duct, leading to the precipitation vessel 14, such an amount of an aqueous iron(II) sulfate solution containing 25 g/l of $FeSO_4 \cdot 7H_2O$ was fed that the waste water contained 346 mg/l of $Fe^{2+}$ ions. Via the duct 15, such an amount of 18% sodium hydroxide solution was added to the waste water 21 in the precipitation vessel 14 that a constant redox potential of $-0.68$ volt, relative to the normal hydrogen electrode, was established therein. This redox potential in 14 was measured by means of a device (not shown) which operated the control valve 16 via a corresponding pneumatic line (not shown). After a mean residence time of about 1 hour, the suspension 21 obtained left the precipitation vessel 14 provided with an agitator 12 via the duct 17 and was thus forwarded to the closed suction filter 18. The gas zone of precipitation vessel 14 and of suction filter 18 was filled with nitrogen (not shown). The filtrate left the suction filter 18 via the duct 19. The analysis of the filtrate resulted a mean residual mercury concentration of 0.04 mg Hg/liter. The filter residue contained 0.8% of Hg, relative to the dry substance.

EXAMPLE 2

In an apparatus according to FIG. 2, where the oxidation vessel has a capacity of 0.20 m³ and the precipitation vessel had a capacity of 0.11 m³, a continuous waste water current of 0.11 m³/h coming from a chlorine-alkali electrolysis operating according to the amalgam process and having an average composition of 90.0 g/m³ of Hg (total amount), 29.5 kg/m³ of NaCl and 3.9 kg/m³ of NaOH was treated in the manner as described. The iron(II) sulfate solution used had a concentration of about 200 g of $FeSO_4$ per liter of solution (anhydrous).

According to the manner described in Example 1, the dates adjusted in the apparatus were the following:

| Oxidation vessel | | | Overflow $Fe^{2+}$ [Mg/liter] | precipitation vessel $E_h$ [V] |
|---|---|---|---|---|
| pH | active chlorine [mg/liter] | $E_h$[V] | | |
| 2.8 | 10.1 | +1.30 | 503 | −0.68 |

The residual mercury content in the filtrate was on the average 0.05 mg/liter, while the sludge filtered off contained 6.3% of Hg, relative to the dry substance.

EXAMPLE 3

In a pilot-plant apparatus according to FIG. 2, where the oxidation vessel had a volume of 0.50 m³ and the precipitation vessel had a volume of 0.75 m³, a continuous waste water current of 1 m³/h coming from a sodium chloride electrolysis operating according to the amalgam process and having the following composition: Hg (total amount) 31.0 g/m³, NaCl 45.1 kg/m³, NaOH 1.2 kg/m³ was treated. The iron(II) sulfate solution had the same concentration as in Example 2.

The following conditions were established according to the manner as described in the oxidation and precipitation vessel, respectively:

| Oxidation vessel | | | Overflow $Fe^{2+}$ [mg/liter] | precipitation vessel $E_h$ [V] |
|---|---|---|---|---|
| pH | active chlorine [mg/liter] | $E_h$[V] | | |
| 3.3 | 14.3 | +1.30 | 726 | −0.68 |

The filtrate flowing off had a mean content of 0.04 mg/liter of Hg, and in the sludge, 1.0% of Hg, relative to the dry substance, was detected.

EXAMPLE 4

In the apparatus according to FIG. 2, a continuous waste water current of 0.11 m³/h containing on the average 11.0 g/m³ of Hg (total amount), 18.4 kg/m³ of NaCl and 0.18 kg/m³ of NaOH was treated. In this case, the reaction conditions were deliberately chosen in such a manner that the redox potential in the precipitation vessel exceeded the preferred range. The corresponding test conditions are listed in the following Table:

| Oxidation vessel | | | Overflow $Fe^{2+}$ [mg/liter] | precipitation vessel $E_h$ [V] |
|---|---|---|---|---|
| pH | active chlorine [mg/liter] | $E_h$[V] | | |
| 2.0 | 5.5 | +1.30 | 145 | −0.33 |

The filtrate contained still 0.13 mg of Hg/liter on the average.

What is claimed is:

1. A process for reducing the mercury content of industrial waste waters to about only 50 mg/m³ by precipitating the mercury compounds from the waste waters after having converted the total amount of mercury contained in such waters to the ionic bivalent oxidation state by adjusting first the waste water to a pH-value of 4.5 or less by the addition of hydrochloric acid or sulfuric acid, and then adding such an amount of chlorine, chlorinated water or sodium hypochlorite that a content of from 2 to 50 mg of active chlorine per liter waste water is present, which comprises subsequently adding to the waste water, pre-treated in this way, iron (II) ions until a content of from 0.1 to 1.5 g of such ions per liter of waste water is attained, then adjusting a redox potential of from −0.1 to −0.8 volts, relative to the normal hydrogen electrode by addition of a chemical agent increasing the pH selected from the group consisting of alkali lyes and calcium hydroxide thus reducing the bivalent mercury ions to insoluble mercury (I) salt, and precipitating it together with the iron oxide hydrates formed, and finally eliminating the precipitated products.

2. The process as claimed in claim 1, which comprises adjusting the redox potential and subsequently separating the precipitated products in an oxygen-free atmosphere.

3. The process as claimed in claim 1, wherein the waste waters stem from a chlorine-alkali electrolysis operating according to the amalgam process.

* * * * *